United States Patent
Hall

(10) Patent No.: US 10,379,760 B1
(45) Date of Patent: Aug. 13, 2019

(54) DATA STORAGE DEVICE OPPORTUNISTICALLY REFRESHING DATA

(71) Applicant: Western Digital Technologies, Inc., San Jose, CA (US)

(72) Inventor: David R. Hall, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/878,096

(22) Filed: Jan. 23, 2018

(51) Int. Cl.
*G06F 12/00* (2006.01)
*G06F 3/06* (2006.01)

(52) U.S. Cl.
CPC .......... *G06F 3/0619* (2013.01); *G06F 3/0653* (2013.01); *G06F 3/0659* (2013.01); *G06F 3/0676* (2013.01); *G06F 12/00* (2013.01)

(58) Field of Classification Search
CPC ...................................................... G06F 12/00
USPC ....................................................... 711/112
See application file for complete search history.

(56) References Cited

U.S. PATENT DOCUMENTS

| | | | |
|---|---|---|---|
| 6,854,022 B1 | 2/2005 | Thelin | |
| 7,870,460 B2 | 1/2011 | Iketaki et al. | |
| 7,974,029 B2 | 7/2011 | Tsai et al. | |
| 8,320,067 B1 * | 11/2012 | Tsai | G11B 27/36 360/31 |
| 8,531,791 B1 * | 9/2013 | Reid | G11B 20/10009 360/31 |
| 8,699,159 B1 | 4/2014 | Malina | |
| 8,806,117 B2 | 8/2014 | Islam et al. | |
| 9,466,321 B1 | 10/2016 | Vinson et al. | |
| 2005/0166013 A1 * | 7/2005 | Espeseth | G06F 3/0613 711/112 |
| 2011/0026159 A1 * | 2/2011 | Tsai | G11B 5/012 360/75 |

* cited by examiner

*Primary Examiner* — Gautam Sain

(57) ABSTRACT

A data storage device is disclosed comprising a head actuated over a disk comprising a plurality of tracks. A first degradation metric is maintained for a first segment of a first track, wherein the first degradation metric indicates a degree of degradation for data recorded in the first segment. The first degradation metric is processed to select an access command from a plurality of access commands including a read command to read the first segment. The selected access command is executed to access the disk.

20 Claims, 6 Drawing Sheets

US 10,379,760 B1

DATA STORAGE DEVICE OPPORTUNISTICALLY REFRESHING DATA

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figures 2A, 2B:
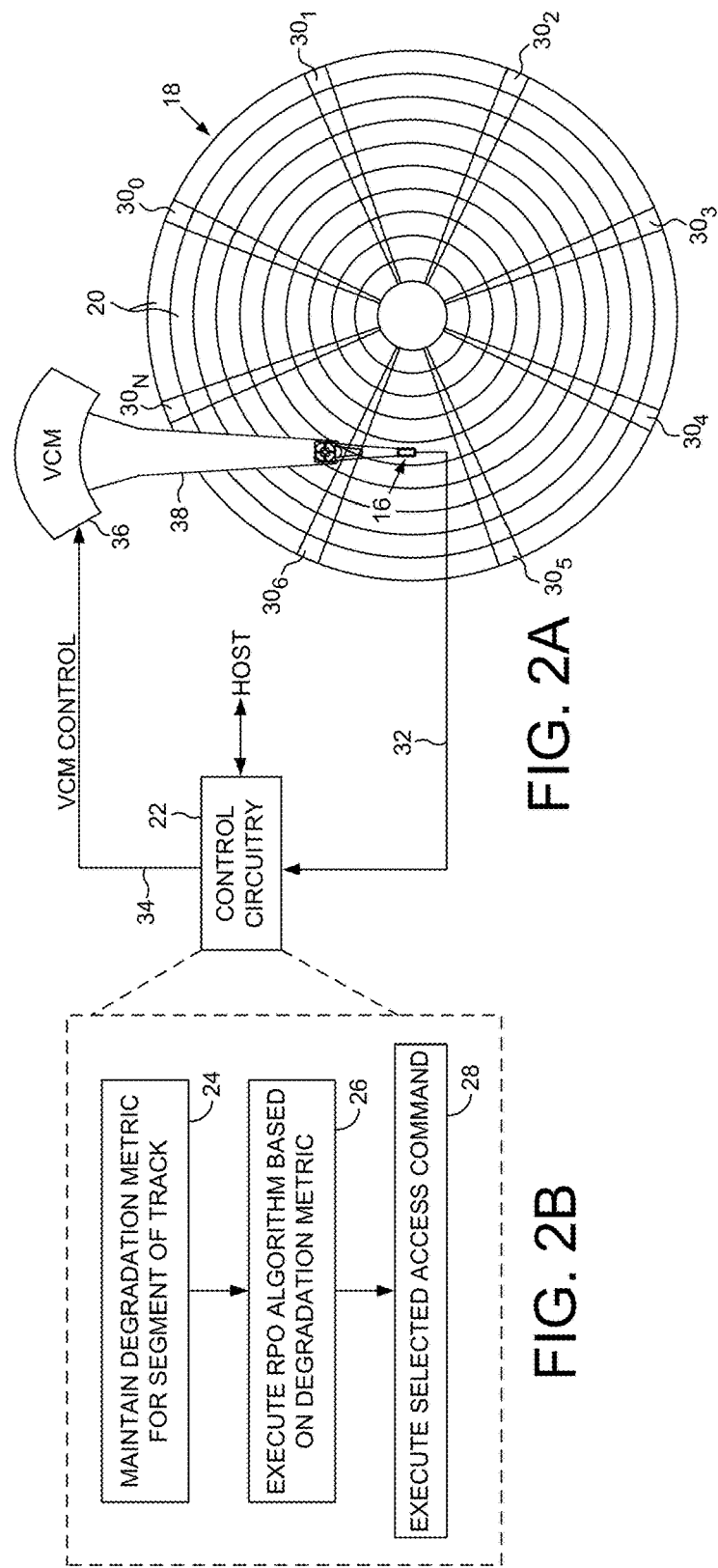
FIG. 2A shows a data storage device in the form of a disk drive according to an embodiment comprising a head actuated over the disk.
FIG. 2B is a flow diagram according to an embodiment wherein a degradation metric is maintained for a segment of a track, and a rotational position optimization (RPO) algorithm selects an access command to execute based on the degradation metric.

FIG. 2A shows a data storage device in the form of a disk drive according to an embodiment comprising a head 16 actuated over a disk 18 comprising a plurality of tracks 20. The disk drive further comprises control circuitry 22 configured to execute the flow diagram of FIG. 2B, wherein a first degradation metric for a first segment of a first track is maintained (block 24), wherein the first degradation metric indicates a degree of degradation for data recorded in the first segment. A rotational position optimization (RPO) algorithm is executed to select an access command from a plurality of access commands including a read command to read the first segment (block 26), wherein the RPO algorithm selects the access command based on the first degradation metric. The selected access command to access the disk is then executed (block 28).

Figure 1:
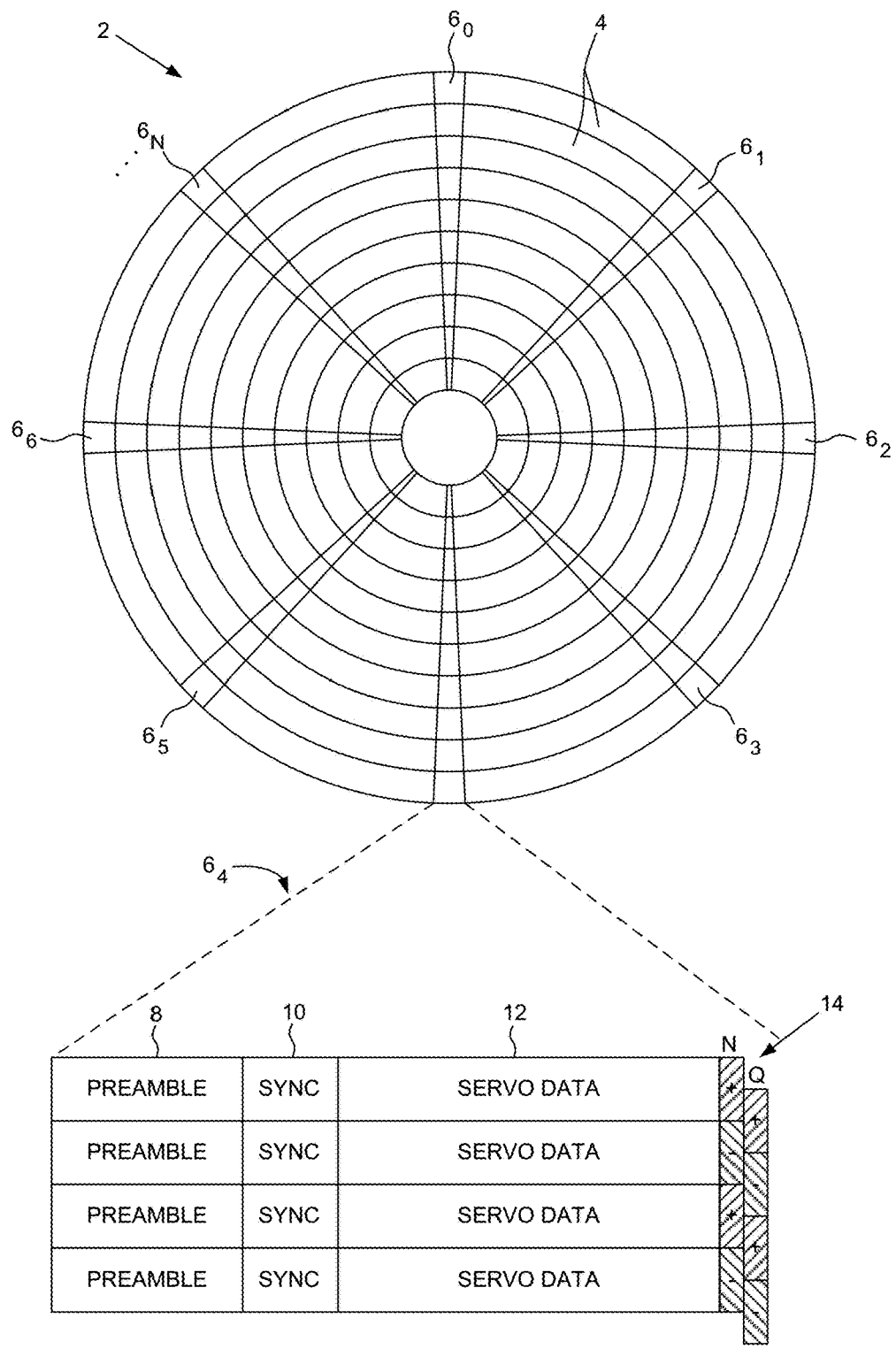
FIG. 1 shows a prior art disk format comprising a plurality of tracks defined by servo sectors.

In the embodiment of FIG. 2A, the disk 18 comprises a plurality of servo sectors $30_0$-$30_N$ that define a plurality of servo tracks, wherein data tracks are defined relative to the servo tracks at the same or different radial density. The control circuitry 22 processes a read signal 32 emanating from the head 16 to demodulate the servo sectors and generate a position error signal (PES) representing an error between the actual position of the head and a target position relative to a target track. A servo control system in the control circuitry 22 filters the PES using a suitable compensation filter to generate a control signal 34 applied to a voice coil motor (VCM) 36 which rotates an actuator arm 38 about a pivot in order to actuate the head radially over the disk in a direction that reduces the PES. The servo sectors $30_0$-$30_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

In one embodiment, the control circuitry 22 executes a RPO algorithm in order to execute a plurality of queued access commands in an order that minimizes the access latency. The access latency typically includes the seek latency to seek the head to a target track, combined with the rotation latency before the head reaches the first sector of the access command within the track. A latency cost may be computed for each access command, wherein the access command having the smallest latency cost may be selected as the next command to execute.

In one embodiment, a degradation metric is maintained for a plurality of segments of a track, for example, for each data sector of a track or a wedge of data sectors between servo sectors, wherein the degradation metric is an indication of how degraded the data recorded in the segment may be. The data recorded in a segment may degrade for any suitable reason, such as a suboptimal condition detected during the write operation (e.g., a high fly height), a write operation to a track-adjacent segment that results in adjacent track interference (ATI), general demagnetization degradation that may occur over time, etc. In one embodiment, the degradation metric may be initialized at the time the segment is written, and then updated over time, such as by incrementing a counter each time there is a write operation to a track-adjacent segment (or near-adjacent segment). When the degradation metric reaches a threshold, the data may be refreshed by reading and then rewriting the segment to ensure the data recorded in the segment remains recoverable.

Figure 3:
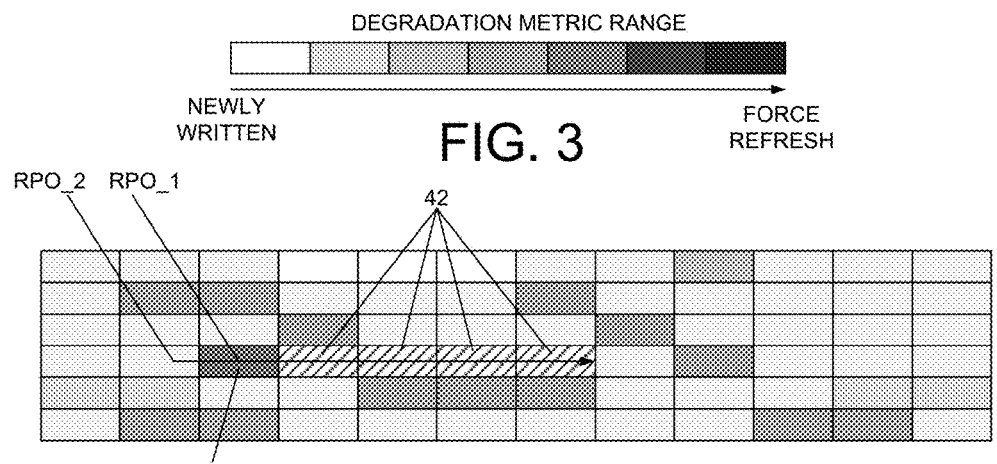
FIG. 3 shows different levels of the degradation metric for a segment of a track from newly written to the need for a forced refresh of the segment according to an embodiment.

FIG. 3 shows an embodiment wherein the degradation metric may be represented using different shades, wherein the darker the shade, the more degraded the segment. In one embodiment, when the degradation metric reaches a predetermined threshold, the segment may be flagged for a forced refresh operation which may be executed in one embodiment by reading and rewriting the segment or the entire track. In an embodiment wherein the entire track is refreshed during a forced refresh operation, the ATI of the resulting refresh write may trigger a forced refresh of an adjacent track, creating a cascading effect that may reduce the performance of the disk drive as seen from the host.

In order to avoid the cascading effect of refreshing an entire track, in one embodiment only a degraded segment of a track is opportunistically refreshed while executing other access commands during normal operation of the disk drive. In one embodiment, a degraded segment of a track may be refreshed opportunistically before the degradation metric reaches a forced refresh threshold, thereby avoiding the forced refresh. In one embodiment, a read command corresponding to a degraded segment may be queued in a command queue and then selected for execution by the RPO algorithm based on a cost/benefit analysis of refreshing the degraded segment. The read command for the degraded segment may be initiated in any suitable manner, such as receiving a host read command, or generating a refresh read command when the degradation metric of the segment reaches a predetermined threshold (less than the forced refresh threshold). In one embodiment, rewriting the data to a degraded segment in order to refresh the segment may occur directly after reading the degraded segment, or in another embodiment, a refresh write command may be added to the command queue and then selected for execution using the RPO algorithm.

Figure 4A:
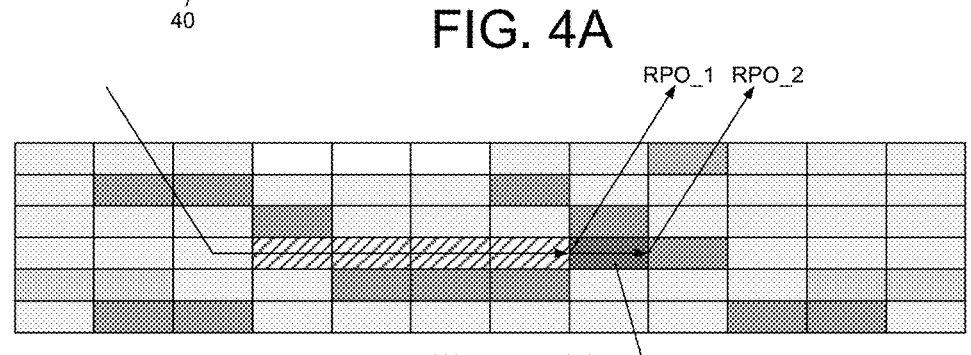
FIG. 4A shows an embodiment wherein a degraded segment preceding a write command may be read as part of executing the write command so that the degraded segment may be opportunistically refreshed.

FIG. 4A shows an example where a degraded segment 40 precedes a number of segments 42 that are to be written as part of a write command (e.g., a host write command). In this example, the RPO algorithm considers the latency cost associated with two seek profiles: a first seek profile (RPO_1) that will cause the head to reach the target track after the beginning of the degraded segment 40, and a second seek profile (RPO_2) that will cause the head to reach the target track before the beginning of the degraded segment 40 so as to enable a refresh read of the degraded segment 40. The RPO algorithm also takes into consideration the benefit of refreshing the degraded segment 40 when deciding whether to perform the refresh read (using RPO_2). In one embodiment, the benefit of the refresh read is based on the proximity of the degradation metric to the forced refresh threshold (FIG. 3). In the example of FIG. 4A, the degradation metric of the degraded segment 40 is closer to the refresh threshold (illustrated with the darker shading), and therefore the benefit of refreshing the segment is higher. That is, the closer a degraded segment is to a forced refresh, the more benefit there is to refresh the segment in order to avoid the forced refresh of the entire track (and a possible cascading effect of a forced refresh).

Figure 4B:
FIG. 4B shows an embodiment wherein a degraded segment following a write command may be read as part of executing the write command so that the degraded segment may be opportunistically refreshed.

FIG. 4B shows an embodiment where a degraded segment 44 may follow a write command, wherein the RPO algorithm considers the latency cost of reading the degraded segment 44 after completing the write operation (using seek profile RPO_2) together with the benefit of refreshing the degraded segment. In one embodiment, the head may arrive at the target track after the beginning of the first segment in the write command which may require the control circuitry to "burn" a revolution in order to write all of the segments of the write command. When this happens, the latency cost of reading any of the degraded segments within the track is essentially zero since the head will pass over the degraded segments anyway. There is still a latency cost associated with performing the refresh write of a degraded segment, and so there may still be a cost/benefit analysis as to which of the degraded segments are read (e.g., only those segments having a degradation metric that exceeds a threshold).

Figure 4C:
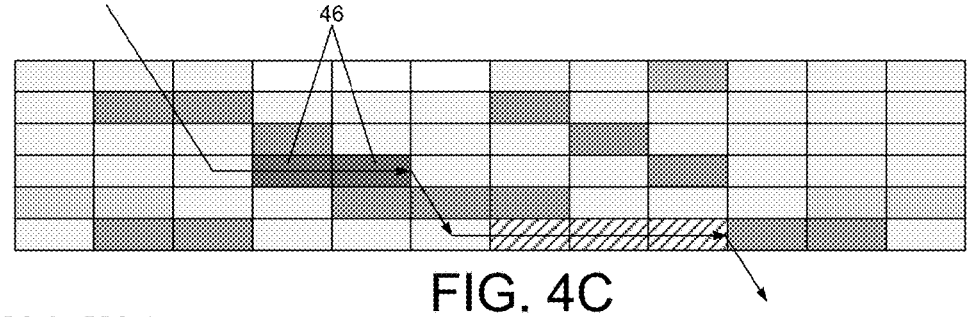
FIG. 4C shows an embodiment wherein a degraded segment may be selected for reading by the RPO algorithm when the latency cost associated with executing the read command together with the benefit of refreshing the segment weighs in favor of executing the read command as compared to executing other access commands.

In one embodiment, any of the degraded segments distributed across the disk may be queued for a refresh read using the PRO algorithm. In the example of FIG. 4C, the degraded segments 46 that are added to the command queue and selected for a refresh read by the RPO algorithm may not be in the same track accessed when servicing a non-refresh command (e.g., a host command). In one embodiment, it may not be practical to add a refresh read of every degraded segment into the command queue as it might overwhelm the processing power of the RPO algorithm. For example, in one embodiment the control circuitry may evaluate the degradation metric of segments that are proximate the target tracks of other pending non-refresh commands. In one embodiment, reading the degraded segments that are proximate other pending commands may minimize the impact on performance in terms of access latency since the head will be in the vicinity of the degraded segments anyway when executing the other access commands.

Figure 4D:
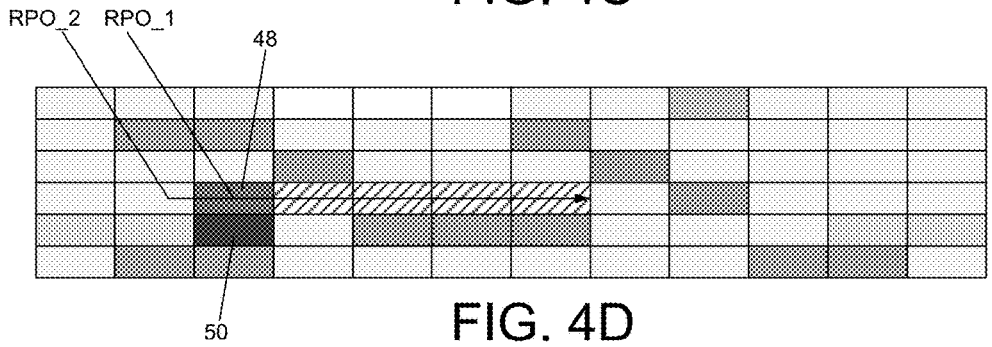
FIG. 4D shows an embodiment wherein the benefit of refreshing a degraded segment is effectively negative since rewriting the data in the segment will cause the degradation metric of a track-adjacent segment to reach a forced refresh level.

Any suitable metric may be evaluated when considering the benefit of refreshing a degraded segment, such as evaluating the level of the degradation metric. In the example of FIG. 4D, the degradation metric for segment 48 may be sufficiently high to warrant an opportunistic refresh; however, the degradation metric for track-adjacent segment 50 is also high. If segment 48 is opportunistically refreshed, the refresh write will increase the degradation metric for segment 50, thereby pushing the degradation metric for segment 50 toward the forced refresh threshold. Accordingly in one embodiment, the refresh benefit of opportunistically refreshing any segment may be based on the degradation metric of track-adjacent segments, wherein the refresh benefit may decrease as the degradation metric of the track-adjacent segments increases.

Figure 5:
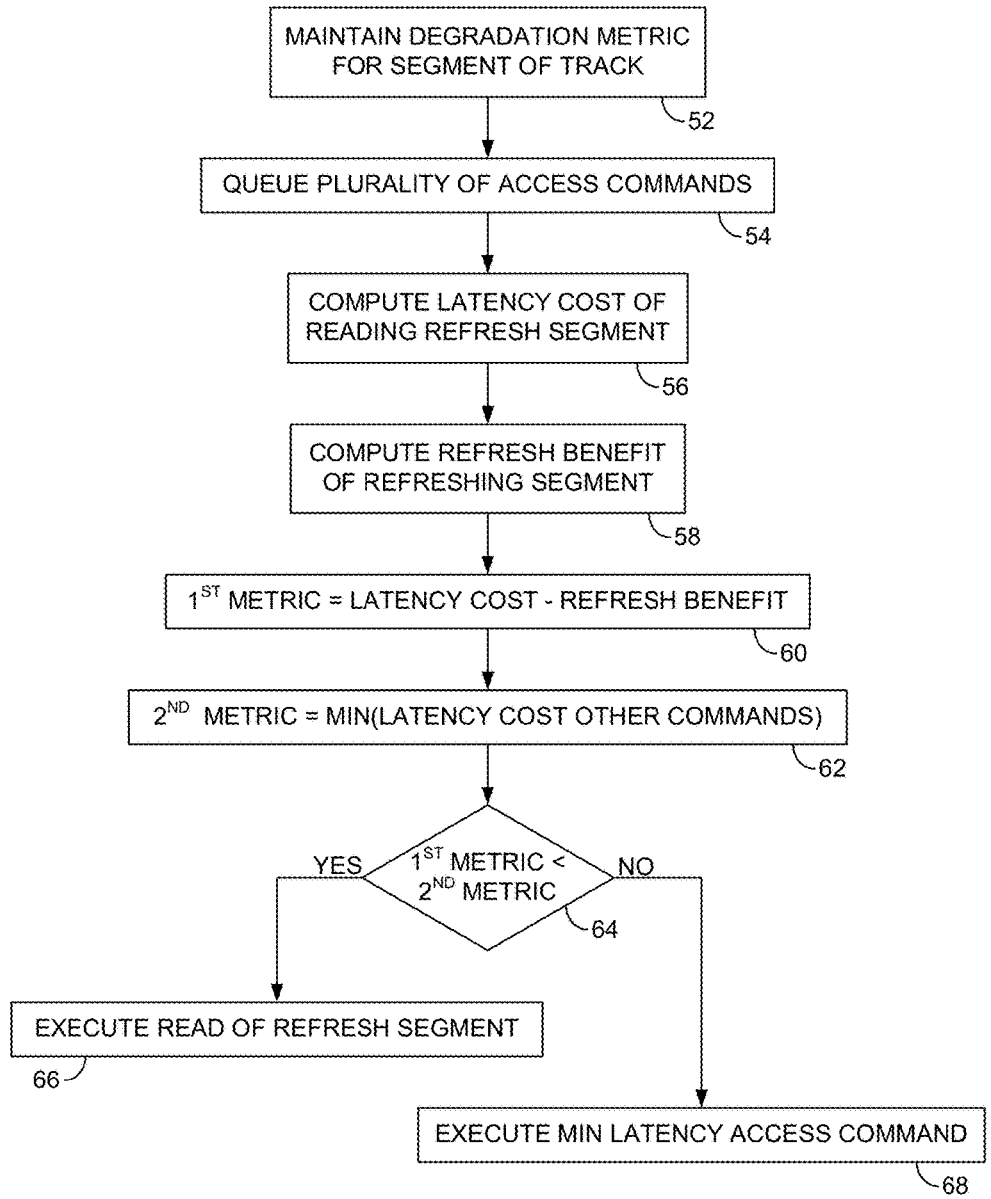
FIG. 5 is a flow diagram according to an embodiment wherein when a first metric generated for a degraded segment is less than a second metric generated for other pending access commands, a refresh read of the degraded segment is selected by the RPO algorithm.

FIG. 5 is a flow diagram according to an embodiment wherein a degradation metric is maintained for a segment of a track (block 52). A plurality of access commands are queued in a command queue (block 54), wherein the access commands may include host commands and background commands (e.g., write verify commands) as well as a refresh read command to read a degraded segment when the degradation metric exceeds a threshold. When executing the RPO algorithm to select a next command to execute from the command queue, a latency cost of reading the refresh segment is computed (block 56), and a refresh benefit of refreshing the segment is computed (block 58). A first metric is generated based on the latency cost and the refresh benefit, such as by subtracting the refresh benefit from the latency cost (block 60). In one embodiment, weighting coefficients may be employed to apply any suitable weighting to the latency cost and refresh benefit when generating the first metric. A second metric is generated (block 62) which represents the minimum latency cost for the non-refresh commands queued in the command queue. When the first metric is less than the second metric (block 64), meaning that the cost/benefit analysis weighs in favor of refreshing the degraded segment, the refresh read command is selected from the command queue for execution (block 66). Otherwise the minimum latency access command is selected from the command queue for execution (block 68).

In one embodiment, the above described weighting of the first metric may deprioritize a refresh read relative to pending host commands in order to minimize the impact on performance as seen from the host. In one embodiment, a host throughput metric may be used to dynamically adjust the weighting of the first metric in order to maintain a target host throughput. In yet another embodiment, the number of pending host commands queued in the command queue may be used to adjust the weighting of the first metric, such as by increasing the weighting proportional to the number of pending host commands so as to prioritize the host commands. In still another embodiment, an aging metric may be associated with each host command and used to adjust the weighting of the first metric so that older pending host commands are prioritized over a refresh read command. The second metric may also be weighted in addition to, or instead of, weighting the first metric in order to prioritize the pending host commands over the refresh read commands.

In other embodiments when configuring the execution order of the access commands, the RPO algorithm may consider other factors in addition to the general seek and rotational latency cost of executing an access command. For example, in one embodiment factors such as throughput of the access commands and/or power consumption may be used to generate a more generalized "fitness score" associated with each access command. In this embodiment, the degradation metric and corresponding refresh benefit becomes yet another factor considered by the RPO algorithm.

Figure 6:
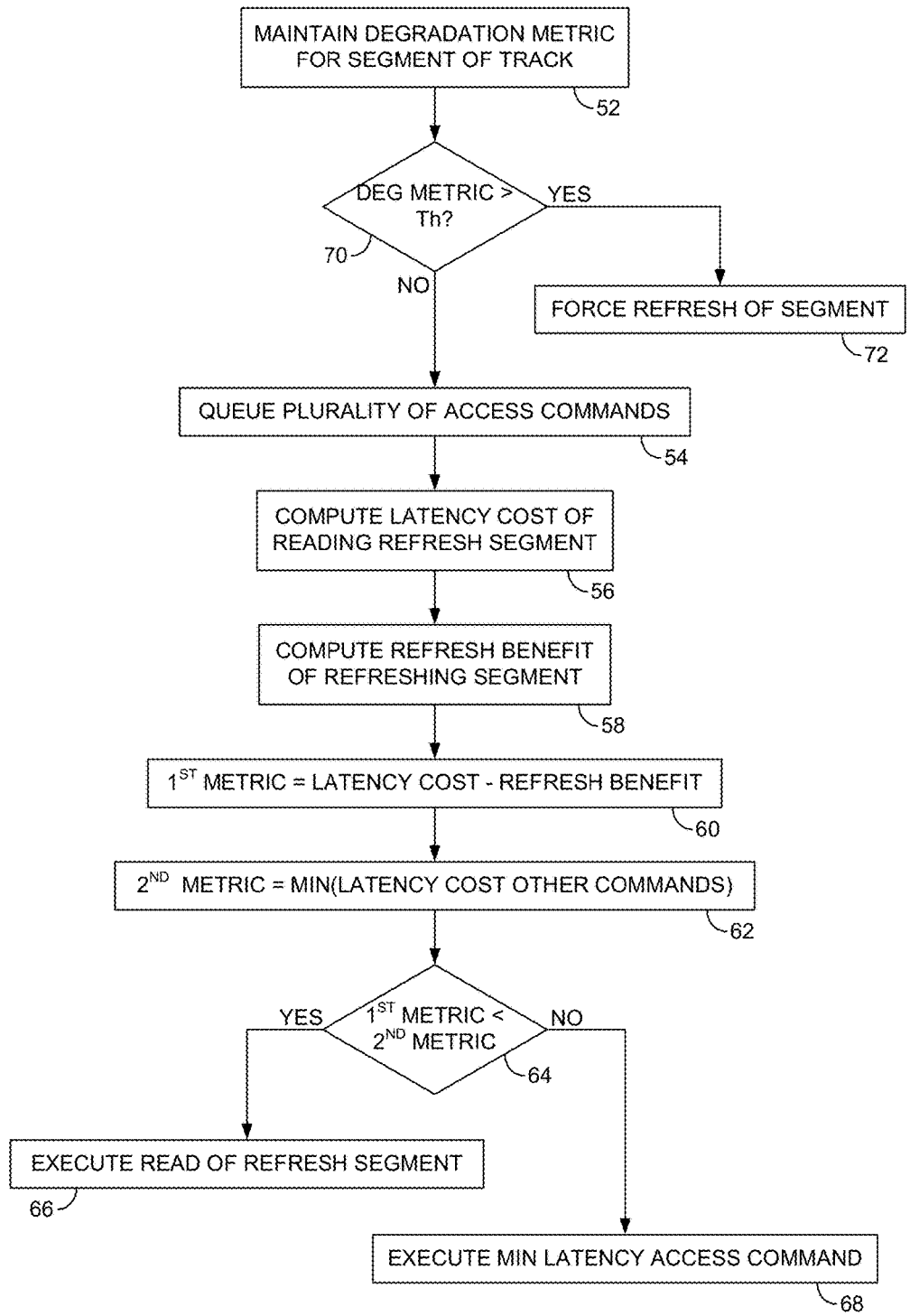
FIG. 6 is a flow diagram according to an embodiment wherein when the degradation metric of a segment exceeds a threshold, a forced refresh of the segment is executed.

FIG. 6 is a flow diagram according to an embodiment which extends on the flow diagram of FIG. 5, wherein if the degradation metric for a segment of a track exceeds a predetermined refresh threshold (block 70), a forced refresh of the segment is executed (block 72). In one embodiment, a forced refresh may be implemented by generating a forced refresh read command that is given higher priority by the RPO algorithm than an opportunistic refresh read command, and in one embodiment, higher priority than even host commands to ensure the degraded segment is refreshed. In one embodiment, a forced refresh of a degraded segment may be implemented by refreshing the entire track; that is, by reading and rewriting all of the segments of a track regardless as to the state of the degradation metric for each segment. This embodiment may provide the best throughput performance since refreshing the entire track may consume less overall bandwidth as compared to opportunistically refreshing each segment of a track over a longer period.

Figure 7:
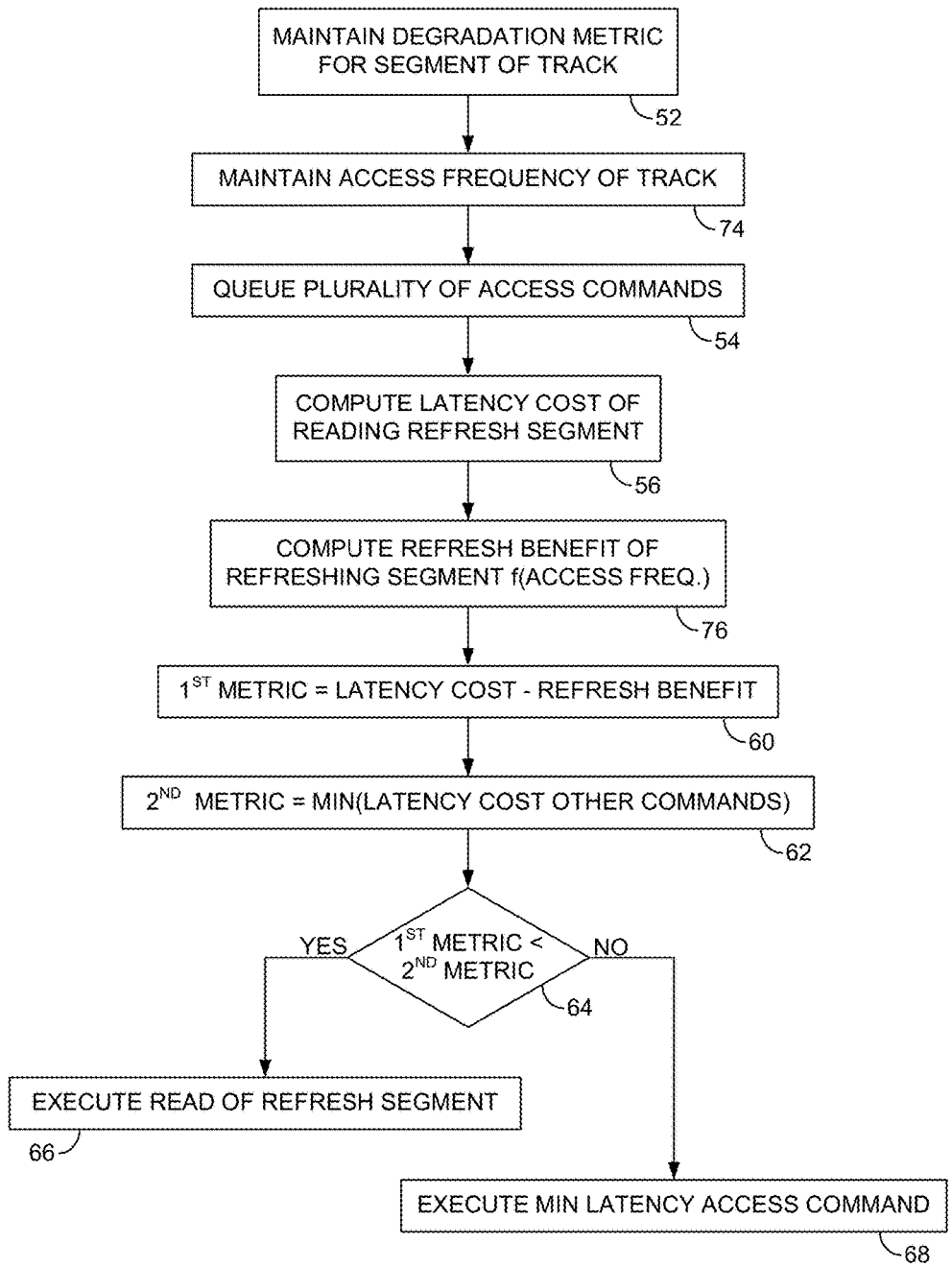
FIG. 7 is a flow diagram according to an embodiment wherein an access frequency is maintained for a track comprising a degraded segment, wherein the benefit of refreshing the segment decreases as the track access frequency increases.

As described above, any suitable metrics may be evaluated at block 58 of FIG. 5 in order to compute the refresh benefit of refreshing a degraded segment. FIG. 7 is a flow diagram according to an embodiment which extends on the flow diagram of FIG. 5, wherein an access frequency of a track is maintained at block 74. The refresh benefit of refreshing a degraded segment is then computed based on the access frequency of the track (block 76). For example, in one embodiment as the access frequency of a track increases, the refresh benefit of refreshing a degraded segment decreases since there is a higher likelihood that the track will be accessed again in the near future. Referring again to FIG. 3, if the degradation metric for a segment is near the middle of the range and the access frequency of the track is high, then the benefit of refreshing the segment may be lower since there will likely be another opportunity to refresh the segment in the future (after the degradation metric has increased further toward, but not yet reached, the forced refresh threshold).

Any suitable technique may be employed to maintain the access frequency of a track at block 74 of FIG. 7. In one embodiment, an actual access frequency for each track may be maintained, for example, by counting the number of times a track is accessed and dividing by the total number of access commands (or dividing by time or any other suitable denominator) over a predetermined window (of access commands, time, etc.). In another embodiment, the access frequency of a track may be estimated by evaluating the degradation metric of a segment before it is overwritten by a write command, wherein in one embodiment the lower the degradation metric the more likely that the access frequency of the track is higher. That is, a lower degradation metric for an overwritten segment may indicate that the segment is being written at a higher frequency, and therefore the track is being accessed at a higher frequency.

In one embodiment, the access frequency attributed to any particular segment may be computed based on the access frequency of a plurality of proximate tracks. For example, the access frequency attributed to a segment may be the highest access frequency of the track within a band of tracks that is proximate the segment (e.g., the segment being in the track at the middle of the band of tracks). In one embodiment, the access frequency for each track in the band may be weighted, for example, by giving less weight to the tracks that are further away from the track comprising the degraded segment.

In an embodiment wherein the refresh write command may be inserted into the command queue for selection by the RPO algorithm, a cost/benefit analysis similar to the read refresh command described above may be computed for the refresh write command to determine when it should be executed. In one embodiment, the refresh benefit of executing a refresh write command may be given less weight as compared to a refresh read command since the data for the degraded segment has already been read and temporarily staged in memory (e.g., in volatile or nonvolatile semiconductor memory, or a staging area on the disk). In one embodiment, if the degradation metric for a segment reaches the forced refresh threshold and there is a pending refresh write command for the segment in the command queue, the refresh write command may be given higher priority in the RPO algorithm to force the refresh of the segment. In this embodiment, the refresh write command may be executed to refresh the segment rather than refreshing the entire track since the latency of the refresh read command has already occurred. That is, when there is already a pending refresh write command for a segment that reaches the forced refresh threshold, it may consume less overall bandwidth to execute the refresh write command as compared to reading and rewriting the entire track in order to refresh the entire track.

In one embodiment, a degraded segment may be read during normal operation of the disk drive as part of a host read command or other non-refresh read command (e.g., a background command). If this happens, the refresh benefit of refreshing the segment may be evaluated to determine whether to generate a refresh write command for insertion into the command queue. When a refresh write command is inserted into the command queue, the latency cost and refresh benefit of executing the refresh write command may be evaluated to determine when to select the refresh write command for execution, similar to the embodiments described above.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, hybrid drives (disk plus solid state), etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a disk comprising a plurality of tracks;
a head actuated over the disk; and
control circuitry configured to:
    maintain a first degradation metric for a first segment of a first track, wherein the first degradation metric indicates a degree of degradation for data recorded in the first segment;
    process the first degradation metric to select an access command from a plurality of access commands including a read command to read the data recorded in the first segment;
    execute the selected access command to access the disk; and
    force a refresh of the data recorded in the first segment when the first degradation metric exceeds a forced refresh threshold,
wherein:
    the access command is selected based on a latency cost associated with executing the read command and a refresh benefit of refreshing the data recorded in the first segment; and
    the refresh benefit is based on the proximity of the first degradation metric to the forced refresh threshold.

2. The data storage device as recited in claim 1, wherein the read command is a host read command.

3. The data storage device as recited in claim 1, wherein the read command is a refresh read command.

4. The data storage device as recited in claim 1, wherein the read command is selected as the access command to execute when a first metric based on the latency cost and refresh benefit of the read command outweigh a second metric associated with executing at least one of the other access commands.

5. The data storage device as recited in claim 1, wherein the latency cost of the read command comprises at least a seek latency to seek the head to the first track and a rotational latency for the head to reach the first segment.

6. The data storage device as recited in claim 1, wherein the refresh benefit increases as the first degradation metric nears the forced refresh threshold.

7. The data storage device as recited in claim 1, wherein the refresh benefit is further based on a second degradation metric for data recorded in a second track adjacent the first segment of the first track.

8. The data storage device as recited in claim 7, wherein the refresh benefit decreases as the second degradation metric increases.

9. The data storage device as recited in claim 1, wherein:
the control circuitry is further configured to estimate an access frequency associated with the first track; and
the refresh benefit is further based on the estimated access frequency.

10. The data storage device as recited in claim 9, wherein the refresh benefit decreases as the estimated access frequency increases.

11. A method of operating a data storage device, the method comprising:
maintaining a first degradation metric for a first segment of a first track on a disk, wherein the first degradation metric indicates a degree of degradation for data recorded in the first segment;
processing the first degradation metric to select an access command from a plurality of access commands including a read command to read the data recorded in the first segment;
executing the selected access command to access the disk using a head; and
forcing a refresh of the data recorded in the first segment when the first degradation metric exceeds a forced refresh threshold,
wherein:
the access command is selected based on a latency cost associated with executing the read command and a refresh benefit of refreshing the data recorded in the first segment; and
the refresh benefit is based on the proximity of the first degradation metric to the forced refresh threshold.

12. The method as recited in claim 11, wherein the read command is a host read command.

13. The method as recited in claim 11, wherein the read command is a refresh read command.

14. The method as recited in claim 11, further comprising selecting the read command to execute when a first metric based on the latency cost and refresh benefit of the read command outweigh a second metric associated with executing at least one of the other access commands.

15. The method as recited in claim 11, wherein the latency cost of the read command comprises at least a seek latency to seek the head to the first track and a rotational latency for the head to reach the first segment.

16. The method as recited in claim 11, wherein the refresh benefit increases as the first degradation metric nears the forced refresh threshold.

17. The method as recited in claim 11, wherein the refresh benefit is further based on a second degradation metric for data recorded in a second track adjacent the first segment of the first track.

18. The method as recited in claim 17, wherein the refresh benefit decreases as the second degradation metric increases.

19. The method as recited in claim 11, further comprising estimating an access frequency associated with the first track, wherein the refresh benefit is further based on the estimated access frequency.

20. The method as recited in claim 19, wherein the refresh benefit decreases as the estimated access frequency increases.

* * * * *